US010371000B1

(12) United States Patent
Graham

(10) Patent No.: US 10,371,000 B1
(45) Date of Patent: Aug. 6, 2019

(54) FLUSH-MOUNT COMBINED STATIC PRESSURE AND TEMPERATURE PROBE

(71) Applicant: Rosemount Aerospace Inc., Burnsville, MN (US)

(72) Inventor: Lisa Graham, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/934,615

(22) Filed: Mar. 23, 2018

(51) Int. Cl.
*F01D 17/08* (2006.01)
*F23N 5/02* (2006.01)
*G01P 13/02* (2006.01)
*G01P 5/14* (2006.01)
*F23R 3/46* (2006.01)
*F23N 5/24* (2006.01)
*G01L 19/06* (2006.01)

(52) U.S. Cl.
CPC ........... *F01D 17/085* (2013.01); *F23N 5/022* (2013.01); *F23N 5/24* (2013.01); *F23R 3/46* (2013.01); *G01P 5/14* (2013.01); *G01P 13/025* (2013.01); *F23N 2025/04* (2013.01); *F23N 2025/21* (2013.01); *F23N 2041/20* (2013.01); *G01L 19/0681* (2013.01)

(58) Field of Classification Search
CPC ............................... F01D 17/085; F23N 5/022
See application file for complete search history.

(56) References Cited

U.S. PATENT DOCUMENTS

| | | | |
|---|---|---|---|
| 3,605,495 A | 9/1971 | Krause et al. | |
| 8,311,684 B2 | 11/2012 | Riverin | |
| 8,725,384 B2 | 5/2014 | Krull et al. | |
| 9,181,874 B2 * | 11/2015 | Brueck | F02C 7/00 |
| 9,791,342 B2 | 10/2017 | Hurst et al. | |
| 10,113,555 B2 * | 10/2018 | Ising | F02B 37/013 |
| 2004/0134282 A1 | 7/2004 | Hayashi et al. | |
| 2010/0232930 A1 * | 9/2010 | Gregory | F02C 3/14 415/115 |
| 2010/0250051 A1 | 9/2010 | Nestico et al. | |
| 2017/0101896 A1 * | 4/2017 | Manning | B04C 3/00 |

FOREIGN PATENT DOCUMENTS

EP  3199938 A1  8/2017
GB  2124706 A   2/1984

OTHER PUBLICATIONS

Extended European Search Report dated Jun. 13, 2019, received for corresponding European Application No. 19163896.4.

* cited by examiner

*Primary Examiner* — Jewel V Dowtin
(74) *Attorney, Agent, or Firm* — Kinney & Lange, P.A.

(57) ABSTRACT

A pressure and temperature probe includes a probe head, a probe tip extending from the probe head and ending with a sensor face, a pressure channel extending into the probe tip through the sensor face, and a temperature channel extending into the probe tip through the sensor face. A pressure sensor is in fluid communication with a pressure channel and a temperature sensor in fluid communication with the temperature channel. The temperature channel extends parallel to the pressure channel, and the temperature channel is fluidly separate from the pressure channel. The sensor face can be configured to minimally intrude the flowpath of a working fluid, thereby minimizing disruption of the flowpath. The probe can be configured on a gas turbine engine.

20 Claims, 3 Drawing Sheets

US 10,371,000 B1

FLUSH-MOUNT COMBINED STATIC PRESSURE AND TEMPERATURE PROBE

BACKGROUND

The present invention relates generally to gas turbine engines, and more particularly to a sensor system of a gas turbine engine.

A gas turbine engine typically includes a high pressure spool, a combustion system, and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a fan connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressor and the fan to sustain the combustion process.

An engine control system for the gas turbine engine can employ sensors that relay data relating to various properties of the engine and its operation. For example, the engine control system may want to know the working fluid temperature and pressure at particular points in the engine. These properties are measured by probes that are communicatively connected to the engine control system. The probes have a particular size, though, which occupies space and adds weight to the engine. In addition, the positioning of the probes can affect the flow of the working fluid, which can affect the measurements of other probes.

SUMMARY

According to one embodiment of the present disclosure, a gas turbine engine extending along an axis comprises: a fan section including a plurality of rotor cascades and a plurality of stator cascades; a splitter downstream of the fan section, the splitter including inner side and an outer side; a compressor section downstream of the splitter; a combustor section downstream of the compressor section; a first turbine section downstream of the combustor section, the first turbine section being connected to the compressor section; a second turbine section downstream of the first turbine section, the second turbine section being connected to the fan section; and a probe assembly including a probe tip including a sensor face; a pressure channel extending into the probe tip through the sensor face; and a temperature channel extending into the probe tip through the sensor face; a pressure sensor in fluid communication with a pressure channel; and a temperature sensor in fluid communication with the temperature channel; wherein: the temperature channel is substantially parallel to the pressure channel; and the sensor face is substantially flush with an inner side of the splitter.

According to another embodiment of the present disclosure, a probe comprises: a probe head; a probe tip extending from the probe head and ending with a sensor face; a pressure channel extending into the probe tip through the sensor face; a pressure sensor in fluid communication with a pressure channel; a temperature channel extending into the probe tip through the sensor face; and a temperature sensor in fluid communication with the temperature channel; wherein: the temperature channel extends parallel to the pressure channel; and the temperature channel is fluidly separate from the pressure channel.

According to another embodiment of the present disclosure, a gas turbine engine extending along an axis comprises: a fan section including a plurality of rotor cascades and a plurality of stator cascades; a compressor section downstream of the fan section; a combustor section downstream of the compressor section; a first turbine section downstream of the combustor section, the first turbine section being connected to the compressor section; a second turbine section downstream of the first turbine section, the second turbine section being connected to the fan section; and a probe assembly including: a probe tip including a sensor face; a pressure channel extending into the probe tip through the sensor face; a pressure sensor in fluid communication with a pressure channel; a temperature channel extending into the probe tip through the sensor face; and a temperature sensor in fluid communication with the temperature channel; wherein the temperature channel extends substantially parallel to the pressure channel.

DETAILED DESCRIPTION

Figure 1:
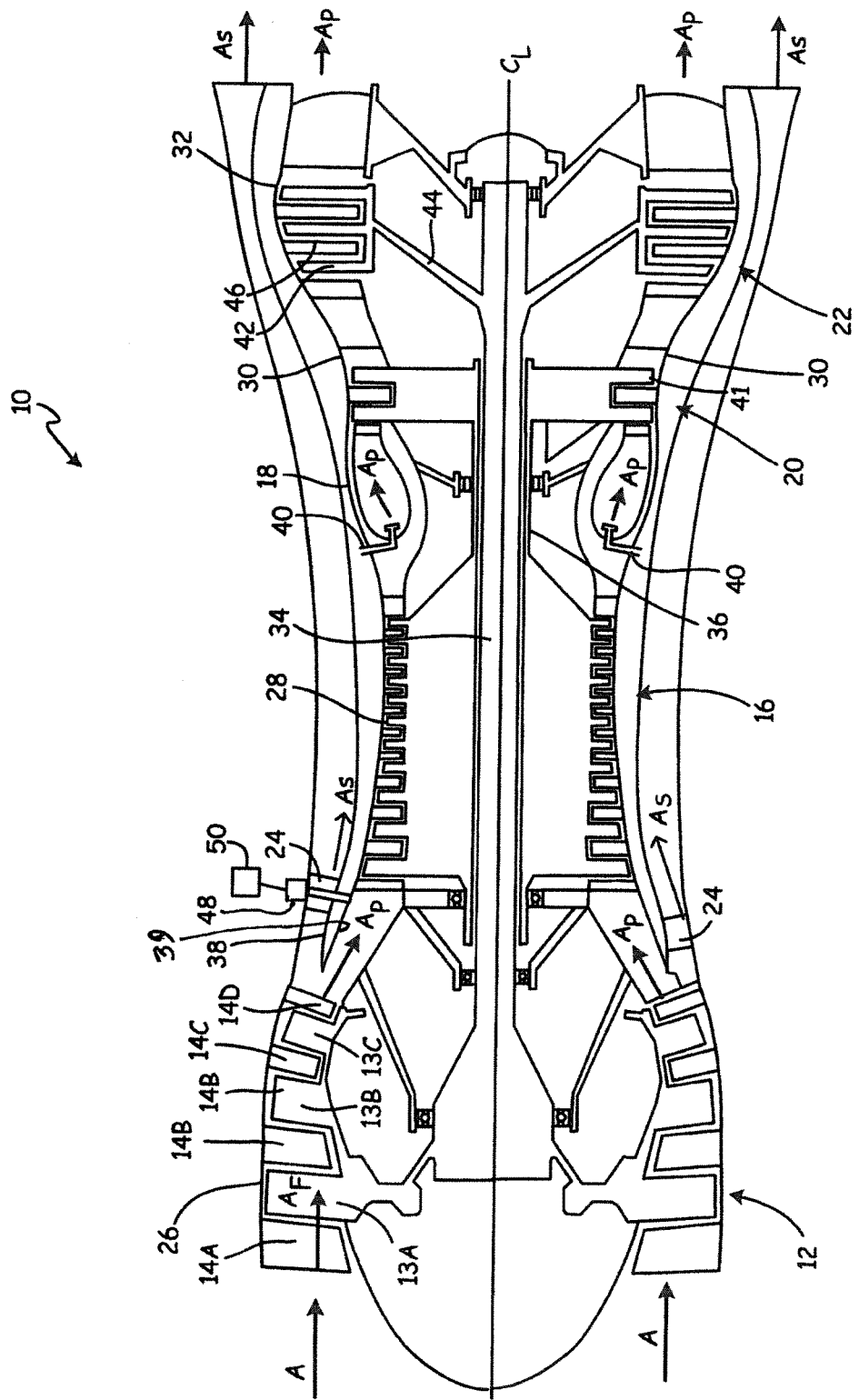
FIG. 1 is a schematic side cross-sectional view of an embodiment of a gas turbine engine.

FIG. 1 is a schematic side cross-section view of gas turbine engine 10. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, fan rotor cascades 13A-13C, fan stator cascades 14A-14D, high pressure compressor (HPC) 16, combustor section 18, high pressure turbine (HPT) 20, low pressure turbine (LPT) 22, struts 24, fan case 26, HPC case 28, HPT case 30, LPT case 32, low pressure shaft 34, high pressure shaft 36, splitter 38, inside surface 39, injectors 40, HPT blades 41, LPT blades 42, support rotor 44, vane airfoil sections 46, probe assembly 48, engine control unit 50, inlet air A, fan air $A_F$, primary air $A_P$, secondary air $A_S$, and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises cold section 11, including fan 12 and HPC 16, and hot section 17, including combustor section 18, HPT 20, and LPT 22. These components are each concentrically disposed around longitudinal engine centerline axis $C_L$. Fan 12 is separated from HPC 16 by a plurality of struts 24, and fan 12 is enclosed at its outer diameter within fan case 26. Likewise, the other engine components are correspondingly enclosed at their outer diameters within various engine casings, including HPC case 28, HPT case 30, and LPT case 32. Fan 12 is connected to LPT 22 through low pressure shaft 34, and together with fan 12, LPT 22, and low pressure shaft 34, comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 at fan 12. Fan 12 comprises fan rotor cascades 13A-13C which are rotated by LPT 22 through low pressure shaft 34 (either directly as shown or through a gearbox, not shown). In conjunction with fan stator cascades 14A-14D (between which fan rotor cascades 13A-13C are positioned, respectively), fan air $A_F$ is accelerated and compressed. At splitter 38, fan air $A_F$ is divided into streams of primary air $A_P$ (also known as gas path air) and secondary air $A_S$ (also known as bypass air). Secondary air $A_S$ produces a major portion of the thrust output of engine 10 while primary air $A_P$ is directed into HPC 16. HPC 16 includes pluralities of rotors and stators, alternately positioned, that incrementally step up the pressure of primary air $A_P$. HPC 16 is rotated by HPT 20 through high pressure shaft 36 to provide compressed air to combustor section 18. The compressed air is delivered to combustor section 18, along with fuel through injectors 40, such that a combustion process can be carried out to produce the high energy gases necessary to turn HPT 20 and LPT 22. Primary air $A_P$ continues through gas turbine engine 10 whereby it is typically passed through an exhaust nozzle to further produce thrust.

After being compressed in HPC 16 and participating in a combustion process in combustor section 18 to increase pressure and energy, primary air $A_P$ flows through HPT 20 and LPT 22 such that HPT blades 41 and LPT blades 42 extract energy from the flow of primary air $A_P$. Primary air $A_P$ impinges on HPT blades 41 to cause rotation of high pressure shaft 36, which turns HPC 16. Primary air $A_P$ also impinges on LPT blades 42 to cause rotation of support rotor 44 and low pressure shaft 34, which turns the rotating components of fan 12.

In addition, gas turbine engine 10 includes probe assembly 48. Probe assembly 48 begins exterior to fan case 26 and HPC case 28, extends through one of struts 24 and splitter 38, terminating flush with inside surface 39 of splitter 38, in fluid contact with primary air $A_P$ adjacent to the wall at the probe face. Thereby, probe assembly 48 can measure the static pressure and total temperature of primary air $A_P$ (i.e., the static primary air $A_P$ temperature plus the kinetic energy of primary air $A_P$). Probe assembly 48 is communicatively connected to engine control unit (ECU) 50 such that ECU 50 receives measurements from probe assembly 48. In the illustrated embodiment, probe assembly 48 is positioned downstream of fan rotor cascades 13A-13C and fan stator cascades 14A-14D and upstream of HPC 16, although in alternate embodiments, probe assembly 48 can be positioned in other locations, such as within HPC 16 or amongst fan rotor cascades 13 and fan stator cascades 14.

The components and configuration of gas turbine engine 10 as shown in FIG. 1 allow for ECU 50 to know the total temperature and static pressure of primary air $A_P$ as reported by probe assembly 48. ECU 50 can then use this information to control gas turbine engine 10 appropriately.

Depicted in FIG. 1 is one embodiment of the present invention, to which there are alternative embodiments. For example, engine 10 can be a three spool engine. In such an embodiment, engine 10 has an intermediate compressor between fan 12 and HPC 16 and an intermediate turbine between HPT 20 and LPT 22, wherein the intermediate compressor is connected to the intermediate turbine with an additional shaft.

Figure 2:
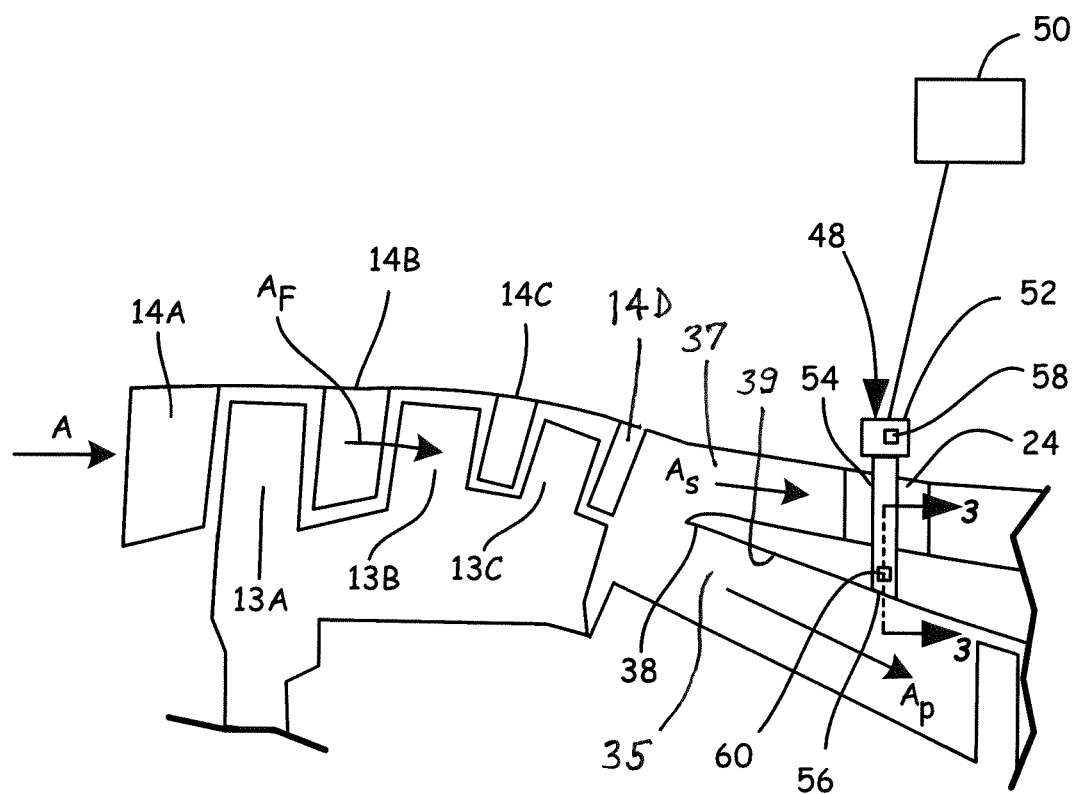
FIG. 2 is a schematic side cross-sectional view of the gas turbine engine proximate a probe assembly.

FIG. 2 is a schematic side cross-sectional view of gas turbine engine 10 proximate a probe assembly 48. Also shown in FIG. 2 are inner side 35 and outer side 37. At splitter 38, fan air $A_F$ is divided into streams of primary air $A_P$, flowing on inner side 35, and secondary air $A_S$, flowing on outer side 37. Probe assembly 48 comprises probe head 52 with probe tip 54 extending therefrom. At the innermost end of probe tip 54 is sensor face 56 which is tangent to inside surface 39 of splitter 38. Thereby, probe tip 54 extends at an acute, upstream angle from the flow of primary air $A_P$. In the illustrated embodiment sensor face 56 is flat, although in alternate embodiments sensor face 56 can be curved to closer match the contour of splitter 38. In addition, sensor face 56 is substantially flush with inside surface 39 of splitter 38 in that no part of sensor face 56 is more than 0.76 mm (0.030 in.) from being even with inside surface 39.

Probe assembly 48 also includes pressure sensor 58, located in probe head 52, and temperature sensor 60, located in probe tip 54 near sensor face 56. Pressure sensor 58 can be a pressure transducer that measures the static pressure of primary air $A_P$, and temperature sensor 60 can be a resistive temperature detector, such as a contact thermometer, that measures the total temperature of primary air $A_P$. The data from pressure sensor 58 and temperature sensor 60 is fed to ECU 50. Because the properties are measured at the boundary of the flow of primary air $A_P$, ECU 50 can do calculations to estimate the average properties of primary air $A_P$ across the primary air flowpath. In other embodiments, pressure sensor 58 can be routed elsewhere in or near ECU 50 by using a pneumatic line (not shown) leading from probe assembly 48 to a remote pressure transducer, thereby providing fluid communication between probe assembly 48 and a remote pressure transducer. This embodiment could be advantageous for harsh environments.

The components and configuration of gas turbine engine 10 allow for the static pressure and total temperature of primary air $A_P$ to be measured without the measurement devices protruding into the flowpath which prevents major flow disturbances due to probe assembly 48. In addition, the static pressure and total temperature data can be transmitted to ECU 50 for further processing and can be used to control gas turbine engine 10. Due to the flush mounted configuration, the sensed temperature differs from the center flow Ap total temperature. This is due to the incomplete $A_p$ flow recovery as the flow comes to theoretical rest at the wall, and also due to wall heat conduction. A correction can be applied to account for this difference using empirical data or approximations based on flow velocity at the probe interface.

Figure 3:
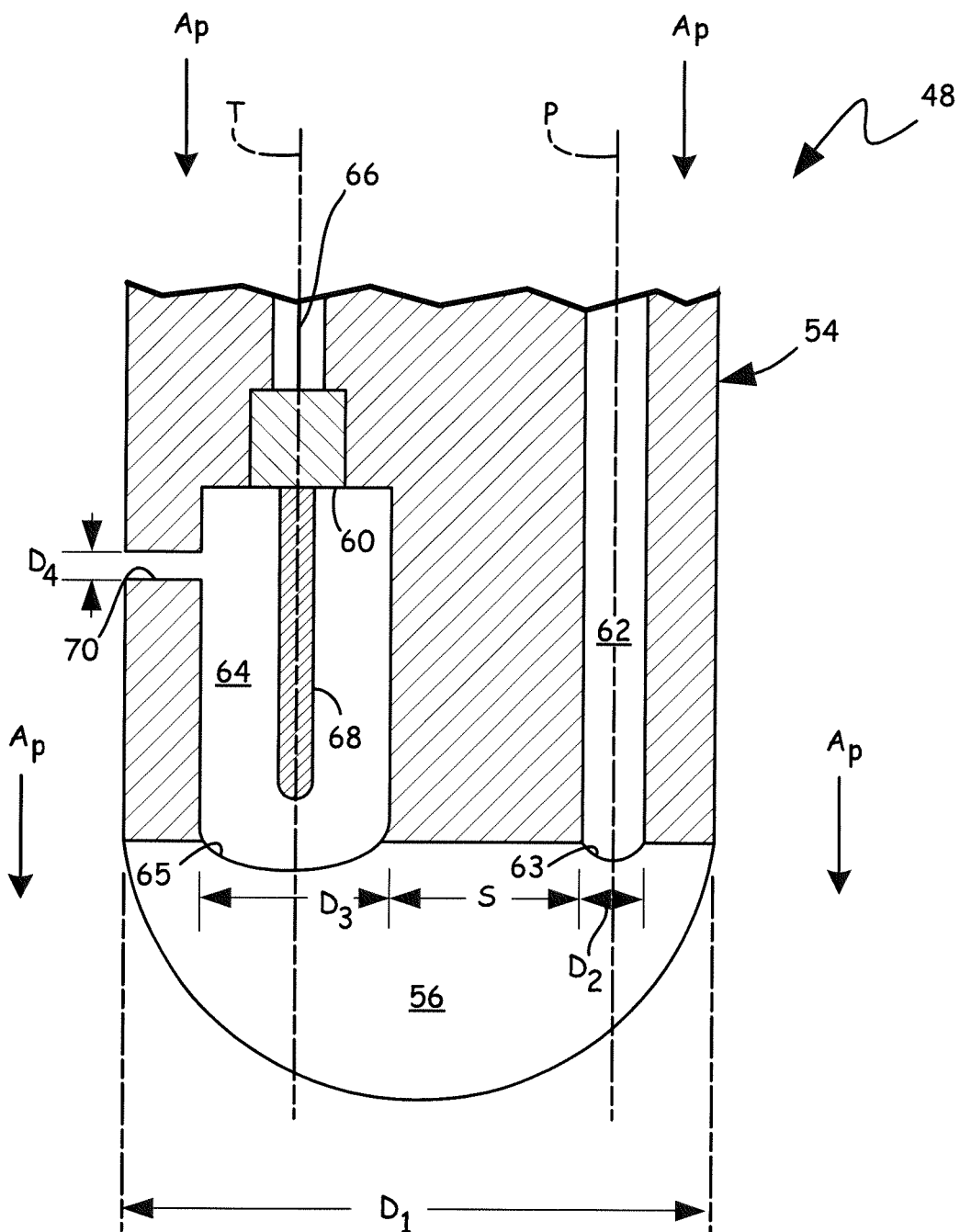
FIG. 3 is a cross-sectional front view of a tip of the probe assembly along line 3-3 in FIG. 2.

FIG. 3 is a cross-sectional front view of probe tip 54 along line 3-3 in FIG. 2. In the illustrated embodiment, two channels extend through probe tip 54 along substantially parallel axes. Accordingly, pressure channel 62 and temperature channel 64 are beside each other, with the center of pressure channel 62 being approximately aligned with the center of temperature channel 64 relative to the $C_L$ axis of engine 10, and with pressure channel 62 and temperature channel 64 being approximately perpendicular to Ap flow. More specifically, pressure channel 62 extends along pressure axis P through probe tip 54, and temperature channel 64 extends along temperature axis T through probe tip 54. Pressure channel 62 begins at pressure orifice 63 in sensor face 56 and extends all of the way to probe head 52 (shown in FIG. 2). Pressure channel 62 is in fluid communication with pressure sensor 58 (shown in FIG. 2). Thereby, primary air $A_P$ can enter pressure channel 62 and the static pressure thereof can be measured by pressure sensor 58.

Temperature channel 64 begins at temperature orifice 65 in sensor face 56 but only extends a portion of the way to probe head 52. Instead, temperature channel 64 terminates at temperature sensor 60, and temperature sensor 60 electronically communicates with probe head 52 via wires 66. Temperature sensor 60 further includes shaft 68 which extends into temperature channel 64 minimally contacting probe tip 54, which thermally isolates shaft 68 from probe tip 54. Probe tip 54 further includes exit port 70 which extends through probe tip 54, distal from the sensor face 56. Thereby, primary air $A_P$ can enter temperature channel 64, pass by shaft 68 which measures the temperature of primary air $A_P$, and exit probe tip 54 via exit port 70, with flow being induced by the differential pressure between temperature channel 64 and exit port 70. In the illustrated embodiment, exit port 70 is located in splitter 38 (between the flowpaths for primary air $A_P$ on inner side 35 and secondary air $A_S$ on outer side 37, shown in FIG. 2) and is oriented laterally (perpendicular to centerline axis $C_L$, shown in FIG. 1). In alternate embodiments, exit port 70 can have alternate orientations and locations. For example, exit port 70 can be located in the flowpath of secondary air $A_S$. In such an embodiment, exit port 70 can be oriented on the upstream side or the downstream side of probe tip 54 and can extend through strut 24 (shown in FIG. 2) such than secondary air $A_S$ can inhibit or encourage flow into temperature channel 64, respectively.

The flow of primary air $A_P$ can be affected by pressure orifice 63 and/or temperature orifice 65. In order to prevent interference of the flow into one orifice by the other orifice, the center of pressure orifice 63 is at the same axial location as the center of temperature orifice 65. In the illustrated embodiment, probe tip diameter $D_1$ is 25 mm (1.0 in.), pressure orifice diameter $D_2$ is 2.5 mm (0.10 in.), temperature orifice diameter $D_3$ is 6.4 mm (0.25 in.), and exit port diameter $D_4$ is 2.5 mm (0.10 in.). In addition, because there is a significant flow of primary air $A_P$ through temperature channel 64, potentially disrupting the static pressure at pressure orifice 63, pressure orifice 63 is spaced laterally apart from temperature orifice 65. Spacing S between the proximate sides of pressure orifice 63 and temperature orifice 65 is between 0.50 and 2.0 times temperature orifice diameter $D_3$. In the illustrated embodiment, spacing S is 4.98 mm (0.196 in.).

The components and configuration of probe assembly 48 allow for the static pressure and total temperature of primary air $A_P$ to be measured by a single, compact device. In addition, the measurements can be taken accurately without the flow at pressure channel 62 being disturbed by the flow of primary air $A_P$ into temperature channel 64.

Discussion of Possible Embodiments

The following are non-exclusive descriptions of possible embodiments of the present invention.

A gas turbine engine extending along an axis comprising: a fan section comprising a plurality of rotor cascades and a plurality of stator cascades; a splitter downstream of the fan section, the splitter including inner side; an outer side, and an inside surface; a compressor section downstream of the splitter; a combustor section downstream of the compressor section; a first turbine section downstream of the combustor section, the first turbine section being connected to the compressor section; a second turbine section downstream of the first turbine section, the second turbine section being connected to the fan section; and a probe assembly comprising: a probe tip including a sensor face; a pressure channel extending into the probe tip through the sensor face; and a temperature channel extending into the probe tip through the sensor face; a pressure sensor in fluid communication with a pressure channel; and a temperature sensor in fluid communication with the temperature channel; wherein: the temperature channel is substantially parallel to the pressure channel; and the sensor face is substantially flush with an inner side of the splitter.

The gas turbine engine of the preceding paragraph can optionally include, additionally and/or alternatively, any one or more of the following features, configurations and/or additional components:

A further embodiment of the foregoing gas turbine engine, wherein the sensor face is offset no more than 0.76 mm from the inside surface of the splitter.

A further embodiment of the foregoing gas turbine engine, wherein the pressure sensor is a static pressure sensor.

A further embodiment of the foregoing gas turbine engine, wherein the temperature sensor is a total temperature sensor.

A further embodiment of the foregoing gas turbine engine, wherein the temperature channel includes an exit port positioned inside of the splitter.

A further embodiment of the foregoing gas turbine engine, wherein the temperature channel includes an exit port positioned outside of the splitter.

A further embodiment of the foregoing gas turbine engine, wherein a center of the temperature channel at the sensor face is in substantially the same axial position as a center of the pressure channel at the sensor face.

A probe comprising: a probe head; a probe tip extending from the probe head and ending with a sensor face; a pressure channel extending into the probe tip through the sensor face; a pressure sensor in fluid communication with a pressure channel; a temperature channel extending into the probe tip through the sensor face; and a temperature sensor in fluid communication with the temperature channel; wherein: the temperature channel extends parallel to the pressure channel; and the temperature channel is fluidly separate from the pressure channel.

The probe of the preceding paragraph can optionally include, additionally and/or alternatively, any one or more of the following features, configurations and/or additional components:

A further embodiment of the foregoing probe, wherein a center of the temperature channel at the sensor face is in substantially the same axial position as a center of the pressure channel at the sensor face.

A further embodiment of the foregoing probe, wherein the pressure sensor is a static pressure sensor.

A further embodiment of the foregoing probe, wherein the temperature sensor is a total temperature sensor.

A further embodiment of the foregoing probe, further comprising an exit port in fluid communication with the temperature channel, the exit port extending through the probe tip distal from the sensor face.

A further embodiment of the foregoing probe, further comprising a duct extending between the temperature sensor and the probe head that is fluidly separate from the pressure channel.

A further embodiment of the foregoing probe, further comprising a fan section comprising a plurality of rotor cascades and a plurality of stator cascades; a compressor section downstream of the fan section; a combustor section downstream of the compressor section; a first turbine section downstream of the combustor section, the first turbine section being connected to the compressor section; a second turbine section downstream of the first turbine section, the second turbine section being connected to the fan section.

A gas turbine engine extending along an axis comprising: a fan section comprising a plurality of rotor cascades and a plurality of stator cascades; a splitter downstream of the fan section, the splitter including inner side, an outer side, and an inside surface; a compressor section downstream of the fan section; a combustor section downstream of the compressor section; a first turbine section downstream of the combustor section, the first turbine section being connected to the compressor section; a second turbine section downstream of the first turbine section, the second turbine section being connected to the fan section; and a probe assembly comprising: a probe tip including a sensor face; a pressure channel extending into the probe tip through the sensor face; a pressure sensor in fluid communication with a pressure channel; a temperature channel extending into the probe tip through the sensor face; and a temperature sensor in fluid communication with the temperature channel; wherein the temperature channel extends substantially parallel to the pressure channel.

The gas turbine engine of the preceding paragraph can optionally include, additionally and/or alternatively, any one or more of the following features, configurations and/or additional components:

A further embodiment of the foregoing gas turbine engine, wherein the pressure sensor is a static pressure sensor.

A further embodiment of the foregoing gas turbine engine, wherein the sensor face offset no more than 0.76 mm from the inside surface of the splitter.

A further embodiment of the foregoing gas turbine engine, wherein the temperature channel includes an outlet positioned inside of the splitter.

A further embodiment of the foregoing gas turbine engine, wherein the temperature channel includes an outlet positioned outside of the splitter.

A further embodiment of the foregoing gas turbine engine, wherein a center of the temperature channel at the sensor face is in substantially the same axial position as a center of the pressure channel at the sensor face.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine extending along an axis comprising:
   a fan section comprising a plurality of rotor cascades and a plurality of stator cascades;
   a splitter downstream of the fan section, the splitter including an inner side, an outer side, and an inside surface;
   a compressor section downstream of the splitter;
   a combustor section downstream of the compressor section;
   a first turbine section downstream of the combustor section, the first turbine section being connected to the compressor section;
   a second turbine section downstream of the first turbine section, the second turbine section being connected to the fan section; and
   a probe assembly comprising:
      a probe tip including a sensor face;
      a pressure channel extending into the probe tip through the sensor face; and
      a temperature channel extending into the probe tip through the sensor face;
      a pressure sensor in fluid communication with a pressure channel; and
      a temperature sensor in fluid communication with the temperature channel;
   wherein:
      the temperature channel is substantially parallel to the pressure channel; and
      the sensor face is substantially flush with the inner side of the splitter.

2. The gas turbine engine of claim 1, wherein the sensor face is offset no more than 0.76 mm from the inside surface of the splitter.

3. The gas turbine engine of claim 1, wherein the pressure sensor is a static pressure sensor.

4. The gas turbine engine of claim 1, wherein the temperature sensor is a total temperature sensor.

5. The gas turbine engine of claim 1, wherein the temperature channel includes an exit port positioned inside of the splitter.

6. The gas turbine engine of claim 1, wherein the temperature channel includes an exit port positioned outside of the splitter.

7. The gas turbine engine of claim 1, wherein a center of the temperature channel at the sensor face is in substantially the same axial position as a center of the pressure channel at the sensor face.

8. A probe comprising:
   a probe head;
   a probe tip extending from the probe head and ending with a sensor face;
   a pressure channel extending into the probe tip through the sensor face;
   a pressure sensor in fluid communication with a pressure channel;
   a temperature channel extending into the probe tip through the sensor face; and
   a temperature sensor in fluid communication with the temperature channel;
   wherein:
      the temperature channel extends parallel to the pressure channel; and
      the temperature channel is fluidly separate from the pressure channel.

9. The probe of claim 8, wherein a center of the temperature channel at the sensor face is in substantially the same axial position as a center of the pressure channel at the sensor face.

10. The probe of claim 8, wherein the pressure sensor is a static pressure sensor.

11. The probe of claim 8, wherein the temperature sensor is a total temperature sensor.

12. The probe of claim 8, further comprising:
an exit port in fluid communication with the temperature channel, the exit port extending through the probe tip distal from the sensor face.

13. The probe of claim 8, further comprising:
a duct extending between the temperature sensor and the probe head that is fluidly separate from the pressure channel.

14. A gas turbine engine extending along an axis comprising:
a fan section comprising a plurality of rotor cascades and a plurality of stator cascades;
a compressor section downstream of the fan section;
a combustor section downstream of the compressor section;
a first turbine section downstream of the combustor section, the first turbine section being connected to the compressor section;
a second turbine section downstream of the first turbine section, the second turbine section being connected to the fan section; and
the probe of claim 8.

15. A gas turbine engine extending along an axis comprising:
a fan section comprising a plurality of rotor cascades and a plurality of stator cascades;
a splitter downstream of the fan section, the splitter including inner side, an outer side, and an inside surface;
a compressor section downstream of the fan section;
a combustor section downstream of the compressor section;
a first turbine section downstream of the combustor section, the first turbine section being connected to the compressor section;
a second turbine section downstream of the first turbine section, the second turbine section being connected to the fan section; and
a probe assembly comprising:
a probe tip including a sensor face;
a pressure channel extending into the probe tip through the sensor face;
a pressure sensor in fluid communication with a pressure channel;
a temperature channel extending into the probe tip through the sensor face; and
a temperature sensor in fluid communication with the temperature channel;
wherein the temperature channel extends substantially parallel to the pressure channel.

16. The gas turbine engine of claim 15, wherein the pressure sensor is a static pressure sensor.

17. The gas turbine engine of claim 15, wherein the sensor face offset no more than 0.76 mm from the inside surface of the splitter.

18. The gas turbine engine of claim 15, wherein the temperature channel includes an outlet positioned inside of the splitter.

19. The gas turbine engine of claim 15, wherein the temperature channel includes an outlet positioned outside of the splitter.

20. The gas turbine engine of claim 15, wherein a center of the temperature channel at the sensor face is in substantially the same axial position as a center of the pressure channel at the sensor face.

* * * * *